United States Patent Office 3,478,873
Patented Nov. 18, 1969

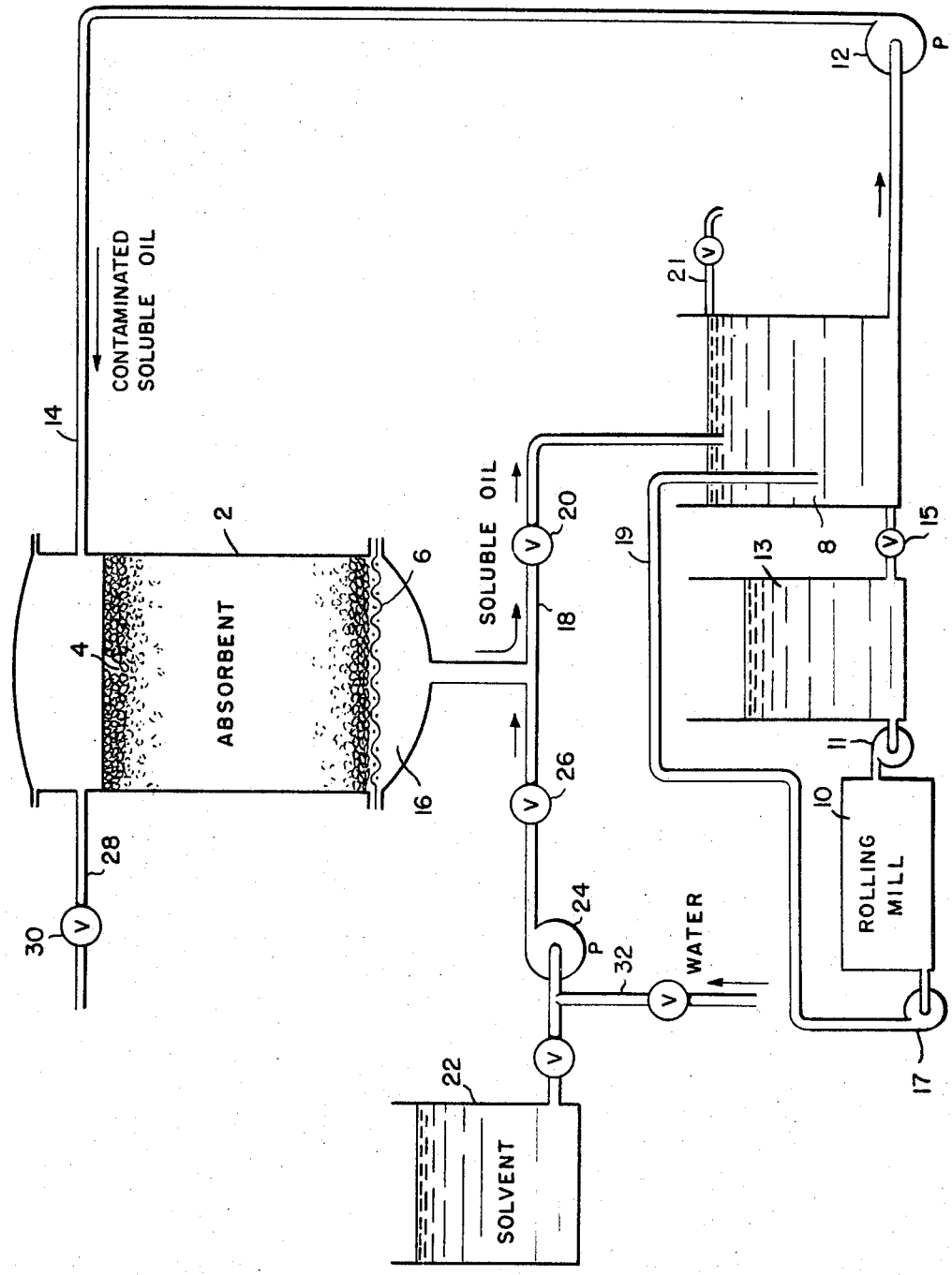

3,478,873
METHOD AND APPARATUS FOR SEPARATION OF TRAMP OIL FROM OIL-IN-WATER EMULSIONS
John O. McLean, Varina, Va., assignor to De Laval Turbine Inc., Trenton, N.J., a corporation of Delaware
Filed Mar. 3, 1965, Ser. No. 436,789
Int. Cl. B01d 23/10
U.S. Cl. 210—23               11 Claims

ABSTRACT OF THE DISCLOSURE

Method and apparatus for the separation of nonemulsified suspended oil droplets from an emulsion of an oil as the dispersed phase in an aqueous continuous phase involving the passing of the emulsion through a bed of a material, preferably in the form of granules, providing flow passages bounded by surfaces of an oil-retaining water-repellent material such as, for example, a polymeric resin or polytetrafluoroethylene.

---

This invention relates to a method and apparatus for the separation of tramp oil from oil-in-water emulsions.

The invention may be best described in connection with a particular use for which it is specially advantageous, and terms will be used applying specifically to that use. As will become evident later, the invention is of broader applicability.

In the rolling of sheet metal, cooling and lubricating liquids are used which are emulsions of oil as the disperse phase in water as the continuous phase, there being present suitable emulsifiers. Such an emulsion is generally referred to as a soluble oil, and may typically consist of about 5% of a lubricating oil dispersed in water carrying an emulsifier such as a rosin soap, a petroleum sulfonate, polyethylene oxide derivatives, or the like. Such soluble oils may vary widely in their oil content; the oil may be of many types depending on the results desired (the oil being usually a petroleum oil) and many varieties of emulsifiers may be used. Typically in such a soluble oil the droplets of the dispersed oil range downwardly from about five microns in diameter. The dispersions are quite stable though they break down to some extent under the conditions of use.

Considering the use of such a soluble oil in the rolling of aluminum, it becomes contaminated in several ways. First, it is contaminated with oil from hydraulic controls and bearings in the rolling mill. It is further contaminated by oil which separates from the emulsion by reason of its degradation. Oil from these sources becomes suspended in the emulsion without becoming actually emulsified: i.e., droplets of this oil appear in the emulsion ranging in size generally upwards of twenty microns in diameter. In the art, the oil forming these droplets is known as tramp oil. The rather fine dispersion of these droplets is due to the violent agitation which occurs during the rolling operation. The tramp oil droplets will gradually separate and float to the surface of the emulsion if it is held sufficiently long in a dentention tank. However, the removal of the tramp oil by this gradual separation is not desirable because of the long periods of detention required involving, necessarily, the provision for use in the mill of unduly large quantities of the soluble oil.

There is a second concurrent contamination of the soluble oil due to the accumulation of solids. In the case of the rolling of aluminum, the contaminating solids are largely aluminum and aluminum oxide. These result from the fact that in the rolling operation portions of the surface of the aluminum are removed from the strips or sheets being rolled. Another solid which contaminates the soluble oil is carbon in the form of particles produced by the decomposition of oil at the high temperatures of rolling, for example around 950° F. The carbon particles are particularly undesirable because they may be pressed into the final aluminum sheet.

Silica and mill dirt also accumulate as solid particles.

The solid particles which appear in accordance with the foregoing are generally less than ten microns in nominal diameter. Microscopic examination reveals that these solid particles accumulate in the droplets of the tramp oil, with little or none entering the actually emulsified droplets of smaller size in the emulsion. This fact makes possible the removal of the solids with the tramp oil, without such direct filtering as would hold back the solid particles independently of the tramp oil.

The general object of the present invention is the separation of the tramp oil, carrying such solid particles as may exist therein, from the emulsion constituting the soluble oil without degradation of the latter. The invention involves such removal without necessitating the use of large detention tanks of a type which would be required for separation by gravity over long periods of time. In accordance with the invention contaminated soluble oil recovered from the rolling mill is treated continuously and returned to the rolling mill with involvement of only such tank or tanks as are desirable to take care of varying demands for the soluble oil.

The foregoing general object and other objects relating to details of operation and construction of apparatus will become apparent from the following description, read in conjunction with the accompanying drawing in which the single figure illustrates in diagrammatic form the equipment involved in processing as applied to metal rolling operations.

The main piece of apparatus which is utilized in carrying out the invention is a container 2 for a bed 4 of an oil-retaining material supported on a screen, or grid, or the like indicated at 6.

In a preferred form of the invention the oil-retaining bed is in the form of chips of Teflon (polytetrafluoroethylene) which chips may have, for example, a size of approximately ⅛ inch nominal diameter, desirably being irregular such as may be produced by the chipping of rods or other forms of Teflon. Instead of Teflon granules, using the term granules in the general sense of covering chips, pellets, beads, or irregular pieces, granules of such materials as polyethylene, polypropylene, polyvinyl chloride, polyvinylidene chloride, or their copolymers may be used. These enumerated materials as well as others have the property, here used, of being readily wetted by oil (lipotropic), and therefore retaining the oil, but of being repellent to water (hydrophobic). Chemical composition is not material except that the materials should be resistant to deterioration by oil, water, and the emulsifying agents which are present; the primary considerations for use are that a material used should have the physical property of a high affinity for oil and should repel water.

The granules are desirably of such size that filtration in the conventional sense does not occur, relatively large passages being provided which under usual circumstances of filtration would readily permit the flow through the bed of particles of the sizes of the solid particles contaminating the soluble oil.

What is found to occur is that as contaminated soluble oil passes through the bed the tramp oil, in the form of the larger droplets described and not truly emulsified, will adhere to the bed material, while the emulsion passes through without degradation, the dispersed oil of the emulsion not being held on the surfaces of the granules, the emulsion having, with respect to the granules, the properties of water. The retained tramp oil which wets the granules carries and holds the solid particles so that the effect is that of removal of these solid particles without filtration in the usual sense of stoppage of particles by reason of their inability to pass through the passages in the bed.

Because of the fact that large passages are provided through the bed, the flow is quite rapid even under small pressure gradients.

The bed which acts as an absorbent of the tramp oil by reason of its selective retention on the granules, has a large, but limited, capacity for retaining the tramp oil and its contained solid materials, but ultimately it becomes ineffective and tramp oil will flow out of the bed to some extent while back pressure is built up. It is then necessary to clean the bed. This cleaning may be best described by considering the overall aspect of operation as follows:

There is indicated at 8 a tank for the soluble oil which may be of relatively small size. The oil is recirculated from this tank by a pump 12 through connection 14, and the tank receives the effluent from the absorbent tank 2. Associated with the small tank 8 is the rolling mill storage tank 13 communicating with the bottom of tank 8 through a valved connection 15. Oil is supplied, as required from the tank 13 by the pump 11 to the rolling mill 10 which is conventional in its operation and its use of the soluble oil and need not be described in detail. From the rolling mill the oil is forced by pump 17 through connection 19 into the tank 8. The demand of the rolling mill is intermittent, and the tank 13 is of a size to permit adequate supply of oil. A valve connection 21 may be used to skim from the surface of the oil in tank 8 accumulated tramp oil which may float to the surface, this skimming arrangement serving to reduce the demands on the absorbent material.

To provide for washing (regeneration) of the absorbent bed, a solvent for the tramp oil containing in a tank 22 may be forced by pump 24 through a connection controlled by valve 26 into the chamber 2 to flow upwardly through the bed and pass outwardly through a pipe 28 controlled by a valve 30. A valve connection for water indicated at 32 is arranged to provide flow of water upwardly through the bed following the washing by the solvent. The solvent is desirably merely a light hydrocarbon material such as kerosene.

The operation, with various selective openings and closings of valves, involves recirculation from the smaller tank 8 through the absorbent bed, so that the oil in the tank 8 is maintained relatively clean though it will receive dirty oil intermittently from the mill 10. This recirculation is desirably continuous, even though the demand of the rolling mill is intermittent. During this recirculation the tramp oil and its contained solids are held by the granules in the bed so that clean soluble oil is returned to the tank 8. When the absorbent becomes insufficiently effective (as may be noted from sampling of its effluent) recirculation is discontinued and the valves reset to provide for cleaning which first involves the flow of the solvent under the action of pump 24 upwardly through the bed. The solvent dissolves off the oil which has been absorbed carrying with it the accumulated solids which may be passed to waste, though auxiliary provision may be made for recovery of the solvent by distillation. The tramp oil which will be absorbed in the on-stream part of the process is generally of relatively high viscosity, in the nature of a lubricating oil, and is tenaciously held during this part of the process by the absorbent, though it is readily removed by solution in the light oil solvent. This solvent adheres to the absorbent, but quantitatively, to a much less extent than the tramp oil.

This situation results from the fact that due to relatively high viscosity a corresponding rather thick layer of the tramp oil adheres to the granules of the absorbent bed; whereas due to the relatively low viscosity of the solvent only a thin layer thereof adheres to the granules. By following the treatment with the solvent by flow of water through the connection 32, much of the adhering solvent is washed away from the absorbent granules which thus ultimately contain only quite small amounts of the solvent so that they are capable of absorbing large quantities of the higher viscosity tramp oil. After the completion of this washing or regenerating procedure, the connections are again restored to the conditions for on-stream flow of the contaminated soluble oil. Such water as may be retained in the bed at the end of the washing operation merely mixes with the soluble oil and appears as a negligible quantity of diluent in the tank 8. Though diagrammed for clarity as shown, the tank 8 will normally have a volume greatly exceeding that of tank 2, while the storage tank 13 may be much larger than tank 8.

To maintain continuous treatment of the soluble oil, a pair of the resin beds may be used, one operating on-stream while the other is being cleaned.

While the invention has been primarily described with reference to utilization in an aluminum rolling mill, identical considerations apply to the use of the invention in connection with rolling of other metals such as steel. In the latter case the contaminating solid material would be largely iron oxide and carbon, but the solids are again retained in the tramp oil and hence removed by the absorbent.

The invention has broader applicability. For example, soluble oils are commonly used in machining or grinding for cooling and lubricating purposes. Here again tramp oil appears from lubricating systems and from degradation of the soluble oil (cutting oil). In such machining operations larger particles of metal or metal oxides or abrasive granules may be carried away in the soluble oil, the particles being too large to be trapped in the tramp oil as described above. The same general treatment may be utilized, but desirably in such case the larger solid particles may be first removed by a suitable conventional filter of cloth or other type. The filtrate, consisting of soluble oil contaminated with tramp oil and with smaller solid particles trapped in the tramp oil may then be passed through a bed 4 with the results previously described. The primary filter is desirable to prevent the bed 4 from becoming charged with large solid particles which may not be readily washed out by a regenerating solvent. Such a primary filter may also be used in rolling operations to remove dirt or other larger particles.

It will be further evident that the invention is applicable to the removal of tramp oil from oil-in-water emulsions even when accumulation of solid particles does not constitute a problem. In such cases advantage is taken of the fact that the tramp oil is absorbed on the granules of the type described without degradation of the emulsion which it is desired to reclaim.

It will be obvious from the foregoing that various modifications of what has been specifically described may be utilized without departing from the invention as defined in the following claims.

What is claimed is:

1. Apparatus, for the separation of nonemulsified suspended oil droplets from an emulsion of an oil as the dispersed phase in an aqueous continuous phase, comprising a support, a pervious separating medium carried by the support, said separating medium having the form of a bed of granules presenting surfaces of an oil-retaining water-repellent material, the bed providing numerous liquid flow passages therethrough bounded by said material, and means directing the liquid to be separated to said medium for flow through the passages.

2. Apparatus according to claim 1 in which said surfaces are provided by a polymeric resin.

3. Apparatus according to claim 1 in which said surfaces are provided by polytetrafluoroethylene.

4. Apparatus, for the separation of nonemulsified suspended oil droplets from an emulsion of an oil as the dispersed phase in an aqueous continuous phase, comprising a support, a pervious separating medium carried by the support, said separating medium having the form of a bed of granules presenting surfaces of water-repellent material being readily wetted by oil, and therefore retaining oil, the bed providing numerous liquid flow passages therethrough bounded by said material, means directing the liquid to be separated to said medium for flow through the passages, said medium providing long tortuous passages for flow therethrough, and means for directing a solvent through said passages to remove accumulated separated oil.

5. The method, for the separation of nonemulsified suspended oil droplets from an emulsion of an oil as the dispersed phase in an aqueous continuous phase, comprising passing such emulsion containing the nonemulsified droplets through a separating medium providing numerous liquid flow passages therethrough bounded by surfaces of an oil-retaining water-repellent material.

6. The method, for the separation of nonemulsified suspended oil droplets from an emulsion of an oil as the dispersed phase in an aqueous continuous phase, comprising passing such emulsion containing the nonemulsified droplets through a separating medium providing numerous liquid flow passages therethrough bounded by surfaces of an oil-retaining water-repellent polymeric resin.

7. The method, for the separation of nonemulsified suspended oil droplets from an emulsion of an oil as the dispersed phase in an aqueous continuous phase, comprising passing such emulsion containing the nonemulsified droplets through a separating medium providing numerous liquid flow passages therethrough bounded by surfaces of an oil-retaining water-repellent polytetrafluoroethylene.

8. The method, for the separation of nonemulsified suspended oil droplets from an emulsion of an oil as the dispersed phase in an aqueous continuous phase, comprising passing such emulsion containing the nonemulsified droplets through a granular separating medium providing numerous liquid flow passages therethrough bounded by surfaces of an oil-retaining water-repellent material.

9. The method, for the separation of nonemulsified suspended oil droplets from an emulsion of an oil as the dispersed phase in an aqueous continuous phase, comprising passing such emulsion containing the nonemulsified droplets through a granular separating medium providing numerous liquid flow passages therethrough bounded by surfaces of an oil-retaining water-repellent polymeric resin.

10. The method, for the separation of nonemulsified suspended oil droplets from an emulsion of an oil as the dispersed phase in an aqueous continuous phase, comprising passing such emulsion containing the nonemulsified droplets through a granular separating medium providing numerous liquid flow passages therethrough bounded by surfaces of an oil-retaining water-repellent polytetrafluoroethylene.

11. The method, for the separation of nonemulsified suspended oil droplets from an emulsion of an oil as the dispersed phase in an aqueous continuous phase, comprising passing such emulsion containing the nonemulsified droplets through a granular separating medium providing numerous liquid flow passages of extended length therethrough bounded by surfaces of water-repellent material being readily wetted by oil and therefore retaining oil, and then providing a flow of oil solvent through said passages to remove accumulated oil therefrom.

References Cited

UNITED STATES PATENTS

| 1,658,362 | 2/1928 | Walker | 210—73 |
|---|---|---|---|
| 2,551,175 | 5/1951 | Smith. | |
| 3,265,212 | 8/1973 | Bonsall | 210—73 |

FOREIGN PATENTS 323,094  12/1929  Great Britain.

MORRIS O. WOLK, Primary Examiner
S. MARANTZ, Assistant Examiner

U.S. Cl. X.R.
210—500; 252—360